No. 789,638. PATENTED MAY 9, 1905.
B. SOMERVILLE.
NON-REFILLABLE BOTTLE.
APPLICATION FILED APR. 27, 1904.

Inventor
Benjamin Somerville.

Witnesses
Frank B. Hoffman
May Taylor.

By Victor J. Evans
Attorney

No. 789,638. Patented May 9, 1905.

UNITED STATES PATENT OFFICE.

BENJAMIN SOMERVILLE, OF NEW YORK, N. Y.

NON-REFILLABLE BOTTLE.

SPECIFICATION forming part of Letters Patent No. 789,638, dated May 9, 1905.

Application filed April 27, 1904. Serial No. 205,165.

*To all whom it may concern:*

Be it known that I, BENJAMIN SOMERVILLE, a citizen of the United States, residing at New York, in the county of New York and State of New York, have invented new and useful Improvements in Non-Refillable Bottles, of which the following is a specification.

This invention relates to non-refillable bottles, the object of the invention being to provide a bottle having combined therewith means which render it practically impossible for the bottle after being emptied of its original contents to be again filled with spurious or inferior liquid, thereby protecting the original bottling agent or firm from injury to their business on the part of fraudulent concerns.

A further object of the invention is to so construct and arrange the several parts of the devices, whereby the introduction of liquid into the bottle is prevented, that they will be maintained in proper working condition at all times and also prevented from injuriously affecting the liquid contents of the bottle.

With the above and other objects in view the invention consists in the novel construction, combination, and arrangement of parts, as herein fully described, illustrated, and claimed.

Figure 1:
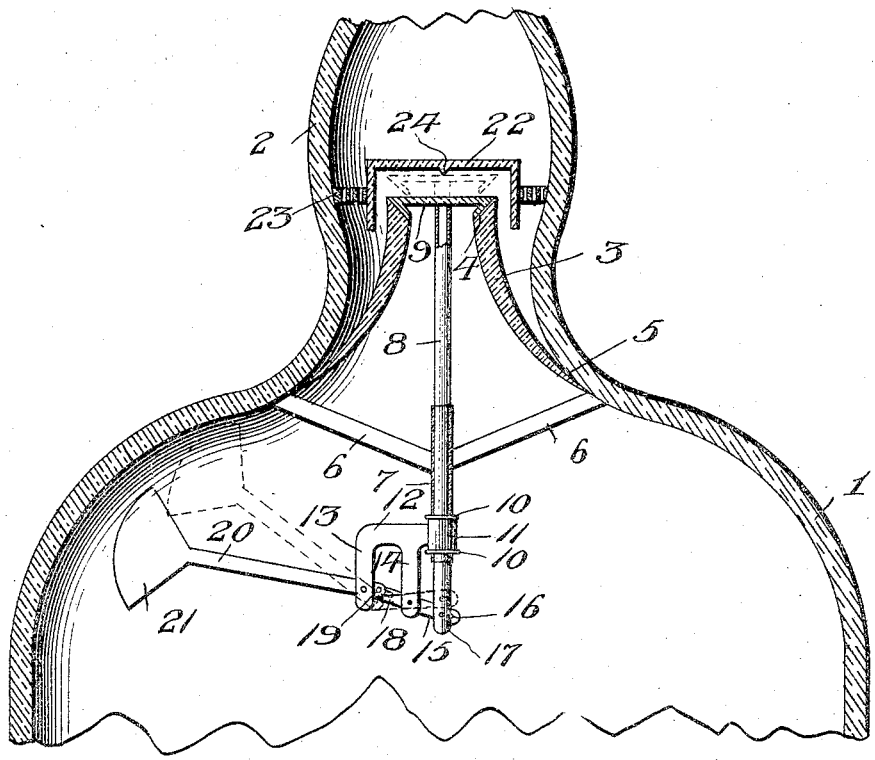
Figure 2:
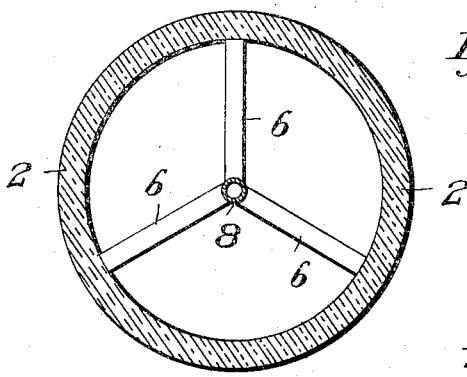
Figure 3:
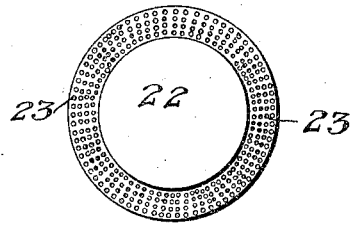
Figure 4:
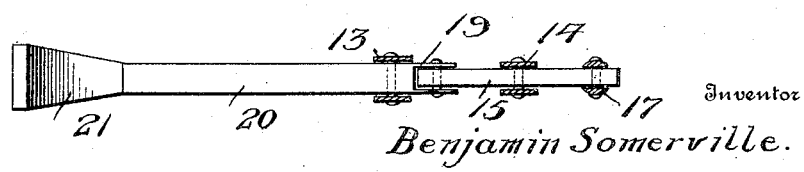

In the accompanying drawings, Figure 1 is a vertical sectional view of a bottle embodying the present invention. Fig. 2 is a cross-section through the neck portion. Fig. 3 is a plan view of the guard and bridge. Fig. 4 is a plan view of the weighted lever and the contiguous parts connected therewith.

Like reference-numerals designate corresponding parts in all the figures of the drawings.

Referring to the drawings, 1 designates a bottle of any usual or preferred construction provided with the usual neck 2.

In carrying out the present invention a valve-seat shell is placed in the neck immediately adjacent to the junction of the neck with the bottle, as shown in Fig. 1. The shell 3 is somewhat conical in shape, contracting gradually on a curve toward its upper end, at which point it is internally beveled to form a conical valve-seat 4. From the valve-seat 4 downward the shell 3 flares outwardly until the lower portion thereof comes in contact with the inner surface of the neck of the bottle, and under the preferred embodiment of this invention the shell 3 is composed of glass and fused along its lower portion to the inner surface of the bottle at 5.

Extending inward from the shell 3 at or near the bottom thereof are radially-converging braces 6, which connect at their inner ends to form a support for a tubular guide 7, which extends vertically and through which passes and slides a stem 8, which is preferably tubular for the sake of lightness and which carries at its upper end a cone-shaped valve 9, which is adapted to fit snugly against the conical valve-seat 4 above referred to, as shown in full lines in Fig. 1. The tubular guide 7 is provided with fixed collars or shoulders 10 adjacent to its lower end and spaced apart to receive between them a rotatable collar or sleeve 11, extending outward from which is a bracket 12, having two substantially parallel arms 13 and 14. Connected pivotally to the arm 14 is a short lever 15, which is fulcrumed intermediate its ends on the arm 14 and provided at one end with a slot 16, which receives a pivot-pin 17, extending through the lower slotted end portion of the stem 8. The other end of the lever 15 is provided with a slot 18, in which is received a pin 19, carried by the short arm of a lever 20, which is fulcrumed on the arm 13, as shown, and the outer end of which is weighted, as shown, at 21. When the bottle is in an upright position, as shown in Fig. 1, the weighted lever 20 through the medium of the short lever 15 acts to depress the stem 8 and hold the valve 9 snugly against its seat. When, however, the bottle is inverted, the weighted lever operates to unseat the valve.

Extending around the valve 9 and the outer end of the shell 3 is an inverted-cup-shaped and flanged guard 22, the same being supported within the bottle-neck by means of a perforated bridge 23, which encircles the flange of the guard 22 and is secured to the inner surface of the neck, the perforations in the bridge allowing the liquid to flow outward through the bottle-neck.

Under the preferred embodiment of the present invention all of the parts of the mechanism hereinabove described are composed of glass fused together at the proper points and also fused to the inner surface of the bottle. Pivots by means of which the two levers are connected to each other and to the stem 8 also consist, preferably, of glass pins, the object in employing glass throughout being to avoid any injurious effect upon the liquid contained in the bottle.

It will be seen that when the bottle is in an upright position or in a horizontal position or in any position between the horizontal and an upright position the valve will be closed by means of the weighted arm 20, thus preventing the fraudulent introduction of liquid into the bottle. Not until the neck of the bottle is tilted considerably below the horizontal will the valve become unseated, so as to allow the liquid to pass from the bottle. Arranged centrally within the guard 22 is a pointed stop 24, which prevents the flat outer surface of the valve 9 from coming in contact with the flat inner surface of the guard 22 and sticking thereto when both of said surfaces are moistened by the liquid in the bottle. By making the stem 8 rotatable as well as slidable and by also making the bracket 12 and the jointed lever rotatable around the tubular guide 7 the weighted lever always assumes a pendent position beneath the stem 8, so as to operate in the same manner at all times no matter which side of the bottle may be uppermost, thus insuring a uniform action of the valve.

I do not desire to be limited to the formation of all parts of the mechanism hereinabove described of glass, as other materials may be used and changes may also be made in the form, proportion, and minor details of construction without departing from the principle or sacrificing any of the advantages of the invention.

Having thus described the invention, what is claimed as new is—

1. A bottle having an outwardly-contracting shell mounted in the neck thereof and provided with a terminal valve-seat, a cup-shaped guard embracing said shell and surrounded by a supporting perforated bridge, said guard projecting below said bridge and forming a tortuous passage between the shell and bridge, and a valve coöperating with said valve-seat and movable within the guard to control said tortuous passage.

2. A bottle having a valve-seat located in the neck thereof, a valve, sliding valve-stem, a tubular guide for said stem, a bracket rotatably mounted on said guide, and a weighted lever fulcrumed on said bracket and joined to said stem.

3. A bottle having a valve-seat located in the neck thereof, a valve, a sliding valve-stem, a tubular guide for said stem, a bracket rotatably mounted on said guide and provided with parallel arms, a weighted lever pivotally mounted upon one of the arms, and a link mounted upon the other arm and joined to the lever at the lower end of the sliding valve-stem, substantially as described.

In testimony whereof I affix my signature in presence of two witnesses.

BENJAMIN SOMERVILLE.

Witnesses:
 JOSEPH STRAUSS,
 J. R. FITZPATRICK.